Nov. 2, 1937.  K. V. G. WALLIN  2,097,542
SELF INFLATING LIFE BELT
Original Filed Feb. 7, 1935
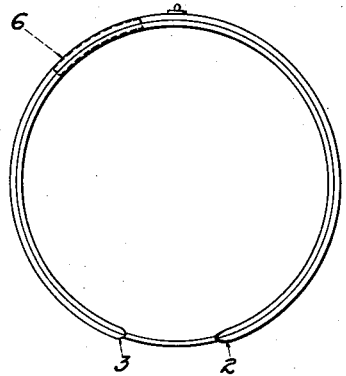
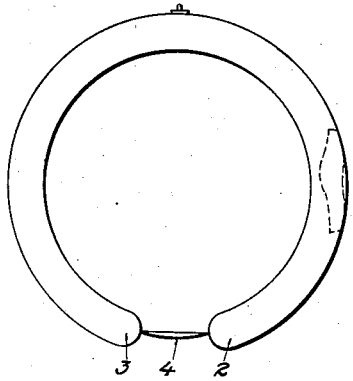
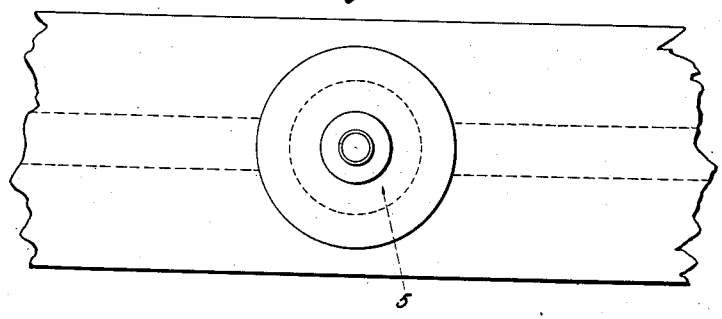
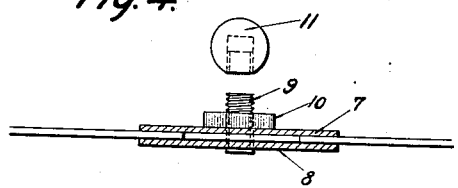
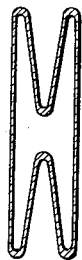
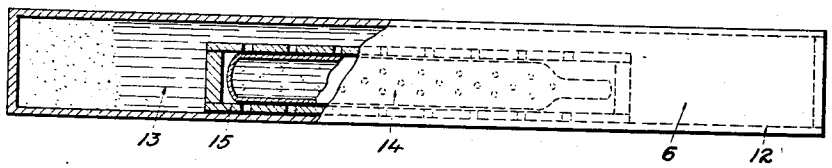
KARL VIKTOR GÖSTA WALLIN
INVENTOR
by
his Att'y.

Patented Nov. 2, 1937

2,097,542

UNITED STATES PATENT OFFICE 2,097,542

SELF-INFLATING LIFE BELT

Karl Viktor Gösta Wallin, Hedensberg, Sweden

Application February 7, 1935, Serial No. 5,358
Renewed August 27, 1937. In Sweden July 26, 1933

1 Claim. (Cl. 9—19)

My present invention relates to inflatable life-belt devices, for example, life-belts of the kind which may be inflated when required in order to receive a sufficient bearing capacity, the gas used for the inflation being obtained from a gas generating cartridge, disposed within the float etc. and consisting of a hermetically closed rubber tube containing a supersaturated solution of sodium bicarbonate in water and a phial enclosing concentrated sulphuric acid.

According to my invention the phial is disposed in a perforated protecting tube closed at both ends and placed within the rubber tube.

The invention is illustrated in the accompanying drawing, in which

Figure 1 is a plan view of a life-belt according to my invention with the gas generating cartridge disposed therein, the belt being in a non-inflated state.

Figure 2 is a plan view of the belt when inflated after the gas generating cartridge has been broken.

Figure 3 is a side elevation of a part of the belt with the introduction valve for introducing the gas generating device.

Figure 4 is a longitudinal section of the said valve.

Figure 5 is a cross section of the belt and

Figure 6 is a detail view of a cartridge.

Referring to the drawing reference character 1 indicates a vulcanized, annular rubber tube with closed ends 2, 3 united with each other by means of an elastic ribbon 4 of for example, rubber or the like. The rubber tube 1 may, if desired, also be completely closed, although this is not so comfortable. The cross section of the rubber tube is preferably of the kind shown in Figure 5 with inwardly folded sides in order not to be too broad when in a non-inflated state.

The rubber tube is provided with a hole 5 for the introduction of a gas generating cartridge 6. The hole 5 may be closed by means of a supply valve 7—11, which, as in the embodiment shown, also may comprise a control valve. The introduction valve consists of two circular metal plates 7, 8, which may be screwed together by means of a central bolt 9 and a nut 10 and between which the walls of the hole 5 may be firmly clamped. The bolt 9 is made hollow and may be closed by means of a screw bushing 11. Thereby it is possible to blow air into the tube 1 through the introduction valve and make certain that the same is tight.

The gas generating cartridge 6 consists of a vulcanized rubber tube 12, which is hermetically closed at both ends and contains a supersaturated solution of sodium bicarbonate in water 13 and a phial 14 of glass filled with concentrated sulphuric acid and placed in a perforated protecting tube 15 which preferably is made of vulcanized rubber or the like and closed at both ends.

Of course, it is possible to use also other equivalent chemical substances, which, when they come in contact with each other, generate a gas.

The device operates as follows: Before use it is ascertained whether the belt is airtight and this is done by blowing in air through the control valve and then deflating the belt again. After that the belt is put on, attention being paid to the cartridge 6 which must be disposed in a position where it may be easily reached. In case of danger of drowning, the rubber cartridge 12 in the belt should be broken, thus smashing the phial and causing the sulphuric acid to mix with the sodium bicarbonate solution to generate a gas sufficient to inflate the belt. The chemical reaction is instantaneous due to the compression arising in the rubber tube 12, before the same will break. The tube 1 is adjusted to a position below the shoulders, and held there by the rubber ribbon 4, thus forming a reliable float to prevent drowning.

Another gas generating cartridge may easily be substituted for one used.

In the first place the belt is intended to protect those who take a bath, and is therefore made in pleasant colors and of such a shape that it may be applied as a waist-belt on the bathing suit.

Having now described my invention, what I claim as new and desire to secure by Letters Patent is:

In an inflatable life saving device, the combination of a belt having an introduction valve, and a gas generating cartridge introduced into the belt through said valve, said cartridge comprising a breakable hermetically closed rubber tube to contain a supersaturated solution of sodium bicarbonate in water, a breakable phial to contain concentrated sulphuric acid arranged in said tube, and a perforated protecting tube enclosing said phial within the rubber tube to prevent the pieces of the phial when broken from passing into the belt through the broken rubber tube.

KARL VIKTOR GÖSTA WALLIN.